Dec. 30, 1969    D. H. FLICKINGER ETAL    3,486,559
FORMATION PLUGGING

Filed Oct. 13, 1966    2 Sheets-Sheet 1

INVENTOR(S)
CLARENCE R. FAST & DON H. FLICKINGER
BY
*John D. Gassett*
ATTORNEY 3,486,559
FORMATION PLUGGING
Don H. Flickinger and Clarence R. Fast, Tulsa, Okla.,
  assignors to Pan American Petroleum Corporation,
  Tulsa, Okla., a corporation of Delaware
Filed Oct. 13, 1966, Ser. No. 586,484
Int. Cl. E21b *33/138, 43/22*
U.S. Cl. 166—252                              28 Claims

ABSTRACT OF THE DISCLOSURE

This invention concerns a method of selectively plugging fractures in an underground formation by injecting a liquir containing finely-divided, low-density, non-settling solids into the formation. The injecting pressure is in the range from the fracture opening pressure to below the fracturing pressure required to create the fracture in the formation. The solids have a particle size of essentially 100 percent being smaller than 60 mesh U.S. Standard Sieve Series. The concentration of the solids is in the range from about 0.1 pound of solids per gallon to about 6.0 pounds per gallon.

---

This invention relates to an improved process for plugging fissures in underground formation penetrated by a well bore, and it particularly concerns the use of such plugging process for use with secondary recoverey operations in which fluid is injected into the formation through one well to displace another fluid to a second well.

The secondary recovery operations for which this invention is most suitable is the liquid displacement type, such as waterflood. In waterflooding operations, water is injected through an input well into the formation to drive oil toward an output or producing well. In many waterflooding projects, the formation has many fractures, or fissures, either naturally occurring or man-made, existing therein. Too frequently, the injected water travels predominately through such existing fractures. When this occurs, the injected water fails to reach the matrix or rock outside the fissures. Consequently, hydrocarbons in such rock or matrix then outside the fissures are largely bypassed or "unswept" by the injected water. Thus, poor sweep efficiency and inefficient hydrocarbon recovery are experienced from the waterflooding operation.

We overcome the water bypassing problem in these situations by plugging such fissures. Briefly, in a preferred embodiment we inject a liquid containing finely-divided, low-density, essentially non-settling solids into said fissures through the well at a pressure above the fracture opening pressure but below the fracturing pressure of the formation. Fracture opening pressure and fracture pressure are used in their normal senses, and briefly defined, fracture opening pressure is a pressure required to open existing fractures. This is ordinarily substantially less than the fracturing pressure which is that pressure required to made new fractures where none previously existed. The fracture opening pressure is normally about 40 to 80% of the fracturing pressure. After the desired quantity of solids has been injected, a non-solids carrying, displacing fluid is usually injected to shove or displace the liquid containing the solids a substantial distance, i.e., 25 to 50 feet, from the input well. The reason for this displacing fluid is to improve injectivity by making use of such fractures immediately adjacent the well bore for injection which, in effect, increases the size of the well bore. The finely divided particles are small enough to readily enter the fissure but sufficiently large so that there is essentially no penetration of the particles into the formation or rock matrix itself. This size can be determined by attempting to force progressively smaller particles into a core taken from the formation. When substantial penetration occurs, then it is known that the limitation of size has been reached. In our process, the finely divided solids are thus packed in the opened fissure away from the well bore, forming a packed mass which is rather impermeable. The packing of the finely divided particles is aided by the carrier fluid, e.g., water leaking through the wall of the gissures into the formation rock itself. As the particles do not substantially penetrate the matrix, there results a gradual increase in concentration as the slurry progresses away from the well bore. Subsequently, injected water then is forced through the matrix, thus increasing sweep efficiency.

A better understanding of the invention and various modifications and objects thereof can be had from the following descriptions taken in conjunction with the drawings in which.

Figure 1:
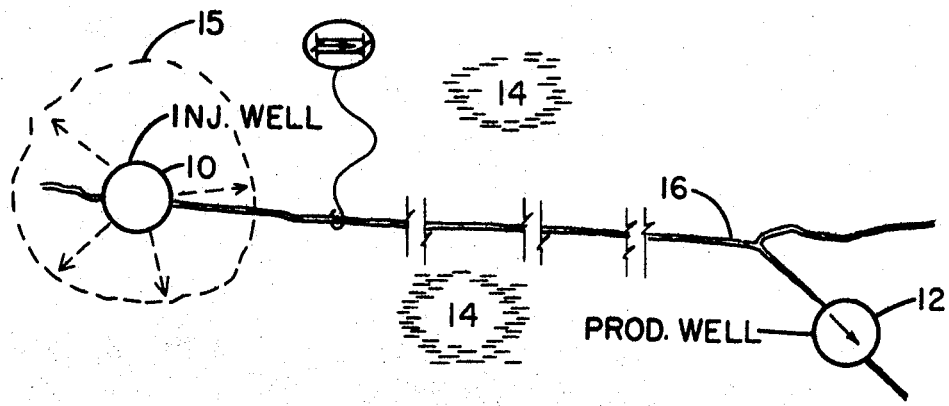
FIGURE 1 is a horizontal section view of an underground formation illustrating a fracture between two wells before treatment.

FIGURE 1 illustrates an injection or an input well 10 and an output or producing well 12, each of which has penetrated hydrocarbon-containing formation 14. This is a top view of a horizontal section through the formation. As illustrated, there is a fracturing system 16 which connects the two well bores. In a waterflood operation, for example, water is injected into well 10 and it is desired that the water "fan out" and sweep oil from a wide portion of formation 14, as indicated by the dotted line 15, to the producing well 12. However, this is not easily attaine when the reservoir has a fracture, because the water always takes the path of least resistance, and here the least resistance is through the fracture 16. The idea, then, is to plug fracture 16 so that the water has to go through the rock matrix. In the past this has been attempted by various means, for example, by plugging selected intervals adjacent the well bore 10. However, if only a small portion of the fracture 16 is sealed adjacent the injection well bore 10, it merely makes injection harder; that is, the injection rate is lowered for a given pressure, and the water will bypass the plugged portion and re-enter the fissure 16, resulting in only a nominal gain in reservoir sweep efficiency. It is therefore desirable to plug fracture 16 for an appreciable distance so that such re-entry into the fracture will not occur for a considerable distance from the injection well.

We plug fissure 16 so that the injected water in a water-drive project does not return to it but rather goes through the matrix. In accordance with our invention in treating a well having such fissures, we inject a carrier liquid, preferably water, containing finely-divided, low-density, non-settling solids into the fracture 16 through well 10 at a pressure above the fracture opening pressure to increase the opening of fracture 16 so that it will more readily accept the finely divided solids. The opened fractures may be as wide as $\frac{1}{10}$ to $\frac{1}{4}$ inch, for example. Normally, we exercise care to keep the pressure below the fracturing pressure so that we will not make new fractures for the water to channel through. If new fissures are formed, it increases the amount of plugging required. By non-settling solids, it is preferred that the solids not settle out of the carrier liquid or fluid for a period of 1 to 24 hours, for example. By low density, it is ordinarily preferred that the grain density of the solids not be over about 1.5 grams per cubic centimeter. It is further preferred that the solids be non-settable in the sense that they do not chemically adhere to each other but form a rather impermeable mass by physical packing or being compressed. The carrier liquid is injected into the formation until the solids have been carried the desired distance into the fractures. One way of knowing when the desired distance has been penetrated is by first determining the volume of the fracture system and then putting in the proportion of the carrier liquid containing the solids sufficient to penetrate the desired distance. The fracture volume can be approximated by injecting a liquid containing a tracer element and carefully measuring the quantity of the injected liquid until the tracer element appears at an output well.

If, after injecting the finely divided solids the desired degree of plugging has not occurred, it is usually preferred to next inject a liquid containing coarse solids, still keeping the pressure above the fracture opening pressure. Such coarse solids are sufficiently coarse to cause a "screenout" in the fracture. A "screenout" means that the solid material stops moving in the fracture, forms a barrier, and the injection pressure builds up rapidly; then fine solids are subsequently injected. This is used for best results so that the fine solids can bridge about the larger particles which become lodged in the fissure and the permeability of the fracture to water becomes very low.

Figure 2:
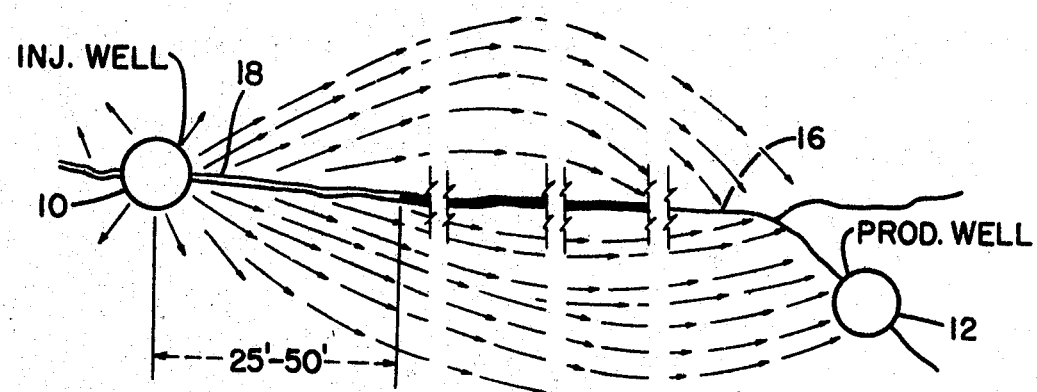
FIGURE 2 illustrates fracture system of FIGURE 1 after treatment according to this invention; and, FIGURE 3 is a graph illustrating injectivity improvement after treatment.

It is desired that a portion 18 of the fracture 16 as shown in FIGURE 2, adjacent well 10, be left unplugged to aid in the subsequent water injection rate. Portion 18 preferably extends a distance varying, for example, from 25–50 feet into the formation. To maintain this portion 18 in an unplugged condition, the solids, both coarse and fine, are driven a selected distance from the well bore by a fluid such as solids-free water. Other fluids may be used, such as viscous guar gum solutions having 10–60 pounds of guar gum per 1,000 gallons of water, and an enzyme to promote hydrolysis under reservoir conditions. As the guar gum-water mixture is rather viscous, it is very effective for displacing the solids farther into the fissure. However, after a period of time, the guar gum gel will liquefy.

The finely divided solids which were first injected in this first embodiment should have a particle size such that essentially 100% pass through a 60 mesh U.S. Standard Sieve Series Screen. Hereinafter, where the term mesh is used, it will be deemed to refer to U.S. Standard Sieve Series Screen. A very suitable low-density, non-settling solid is nutshell flour—for example, ground, hard, plant seeds, such as a material left from the manufacture of rounded nutshells or rounded apricot pit proppant. Such material has a small particle size, e.g., 100% −60 mesh, low grain density of 1.3 to 1.5 grams per cubic centimeter, and is low in cost. Ground plastic, such as phenolics, styrene, and the like, with grain density of 1.1 to 1.5 grams per cubic centimeter, for example, can also be used. The fact that plant-seed flour is finely divided and of low density makes it readily transported out into the fracture by injecting water at relatively low pump rates such as 20 to 200 barrels per hour. Pumps of such capacity are generally used on injection wells. These pumps are normally capable of generating pressure sufficient to part fractures but may not be sufficiently large to generate normal fracturing pump rates and pressures. This is good because we wish to avoid fracturing. Because of these features, expensive service company pumping units, as required for fracturing operations, are not needed. As we mentioned above, it is desired that the finely divided solids be non-settling. If the particle size and density are kept in the ranges given above, there normally is not too much difficulty in keeping them non-settling. However, we have found that the addition of a sub-bentonite (calcium montmorillonite) or bentonite (sodium montmorillonite) drilling clay aids in this regard. It has been found that 1 part clay by weight per 5 to 20 parts nutshell flour, for example, works quite satisfactorily. The preferred ratio is 1 part clay by weight per 10 parts nutshell flour.

An additional advantage of this system is its potential self-energizing, "resealing" feature which may occur if the fracture system containing the mixture is inadvertently reopened. The inadvertent reopening may occur if the post-treatment parting pressure is exceeded. If the fracture system is reopened, and since the mixture does not develop strength, it can shift and fill the enlarged fracture volume and thus reseal the fracture system.

It has also been found that matrix permeability is not seriously reduced should a filter cake of the material be deposited on the well bore on either the injection or producing well bore as described hereinafter. The particle size of the mixture is such that matrix penetration does not occur in the normal range of formation permeabilities encountered. Therefore, the system is selective in that only the fracture system will accommodate the displaced solids. Thus the injectivity or productivity of other sections of the well bore should not be seriously reduced. Therefore, no well bore isolating procedures are necessary to prevent damage to other intervals having normal matrix permeability. Merely a short term pressure reversal that reduces the pressure in the input well will remove the material deposited on the formation face in an injection well. Normal operation effects the correction in a producing well.

It has been found desirable to increase the concentration of the finely divided solids as the treatment progresses. For example, the concentration can be increased linearly from about 0.1 pound per gallon to about 6.0 pounds per gallon of carrier liquid. As mentioned above, due to leakage of water into the formation, the concentration of the solids progressively increases. Then increasing the solids concentration as the treatment progresses tends to cause the fissure to plug simultaneously along the selected length. Sometimes it is desirable to decrease the injection rate while increasing the concentration of finely divided solids, particularly toward the end of the treatment. This helps promote a screenout of the solids in the fracture system which assists in achieving a packed fracture with low permeability in the inter-well area.

The method described herein has been used in the Foster-South Cowden Field of Ector County, Texas, with very good results. The wells in this field produce from the Grayburg formation which has a gross thickness from about 150 to 200 feet at a depth of about 4,100 feet. The wells in this field were normally open-hole completions after being shot with 500–600 quarts of nitroglycerine which enlarged the open hole to a 12 inch to 30 inch diameter. One of the wells completed in this field, identified herein as well A, had been closed in for 1½ months before treatment due to communication with an offset well located approximately 700 feet east of it. In this instance, "free" communication occurred between the two wells with the injection pressure below the parting pressure indicating a partially propped fracture through which the injection fluid flowed. With injection well A closed in, the offset well averaged 45–50 barrels of oil per day, and 530 barrels of water per day, with a bottom hole producing pressure in the range of 600–1,000 p.s.i. This indicated that water from other injection wells in the area was probably still entering the producing well through the fracture system linking it and well A. Just prior to the fracture plugging treatment, injection into well A was resumed at a rate averaging 1,300–1,500 barrels of water per day. The offset well then produced 850 barrels of water per day and negligible oil, with a producing bottom hole pressure of 1,500 p.s.i. The injection well A was treated by injecting 49,000 pounds of nutshell flour-drilling clay mixture at an average rate of 2,600 barrels of water per day. The ratio of nutshell flour to drilling clay mixture was 1 part clay to 10 parts flour. The nutshell flour was ground walnut shells with essentially 100% of the particles passing a 60 mesh sieve. The drilling clay was essentially calcium montmorillonite having a particle size such that approximately 100% passed through a 100 mesh and 90% through a 325 mesh. The concentration of the nutshell flour-drilling clay mixture was 0.1 pound per one gallon of water in the beginning and was 3.1 pounds per gallon at the end of the treatment. The treatment took about eleven hours. While making the treatment, oil was recovered from the offset producing well and the producing bottom hole pressure declined. Two days after the treatment, the offset well produced 67 barrels of oil per day and 525 barrels of water per day, with a producing bottom hole pressure of less than 100 p.s.i. The offset producing well has continued to average 30–40% additional oil over the amount produced prior to treatment, with a water injection rate of 350 b.w.p.d. into the input well A. These results clearly indicate the fissures connecting input well A and the offset producing well have been plugged and that communications through such fissures with other injection wells in the field have been substantially decreased. Since 350–400 barrels of water per day were injected into the input well A with no increase in water from the producing well over the amount produced during the time well A was shut in, it is clear that the reservoir sweep efficiency has been substantially increased.

Figure 3:
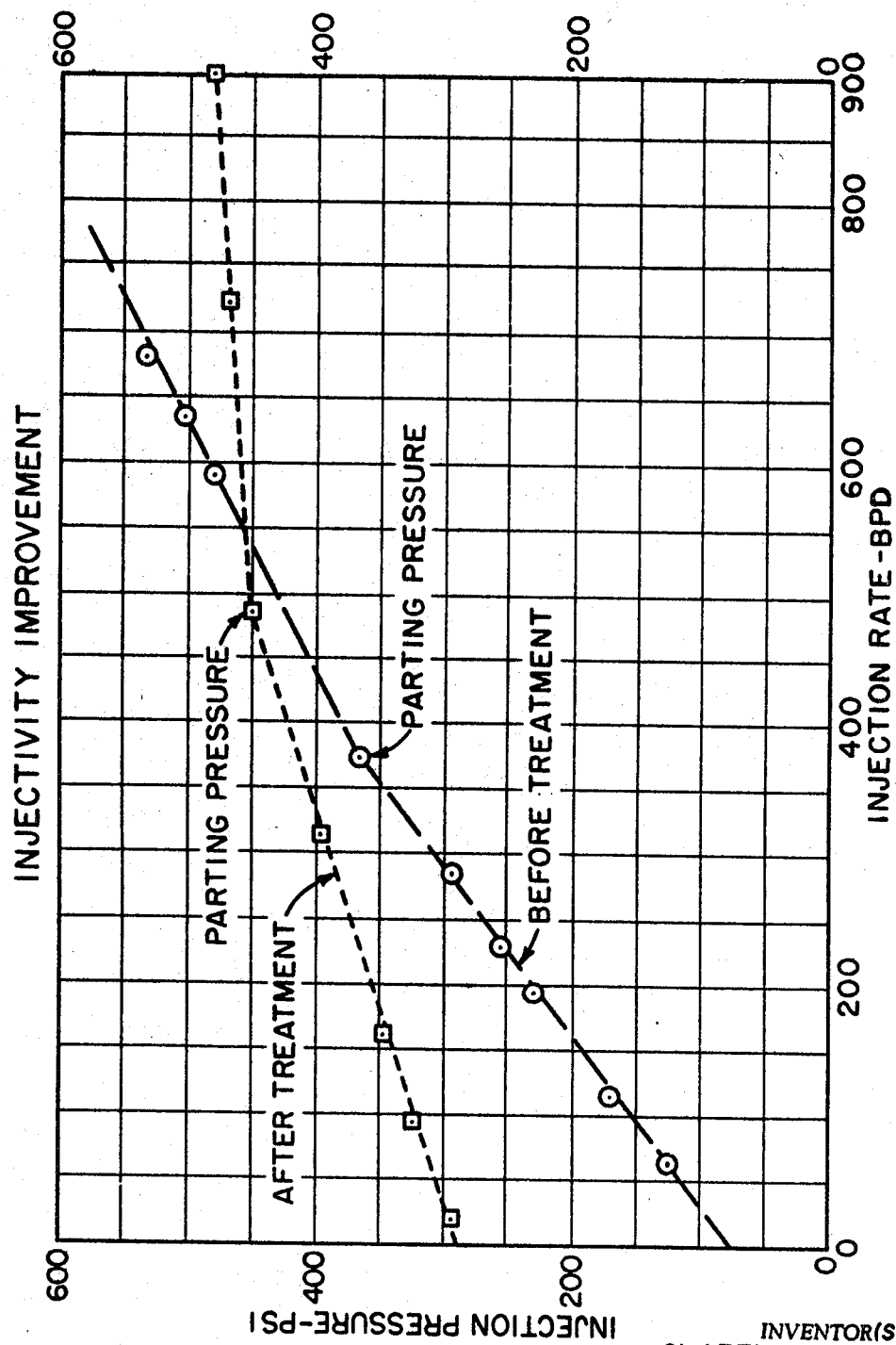

FIGURE 3 is a plot of the injectivity curves for well A, whose treatment was described above, both before and after the well was treated with the nutshell flour-drilling clay mixture. An increase in formation parting pressure to 450 p.s.i. (surface with the hole filled with fresh water) from the pre-treatment parting pressure of 365 p.s.i. was found. While the exact mechanics may not be known, it is felt that the packing of the opened fissures stresses the formation so that the pressure required to subsequently re-open the fracture is increased. Because of this increase, the post-treatment injection rate could be increased approximately 30% over the previous injection rate before complete pressure parting occurred. Thus, in addition to increasing oil production from the offset well, the treatment also resulted in a higher allowable parting pressure at a higher injection rate in the injection well. Being able to effectively inject larger volumes of water into a particular well substantially improves the profitability of this secondary recovery operation. As a matter of interest, in this Foster-South Cowden Field, the fracturing pressure at the surface is typically between about 700 and 1,000 p.s.i.

Various modifications of this invention can be made. For example, the plugging material can be injected into the injection well with the producing well operating until such time as the material appears in the producing well. When this occurs, the producing well is shut down and fluid is injected into the producing well at a pressure sufficient so that the pressure gradient in the fracturing system is reversed, i.e., the pressure in the producing well is now greater than in the formation. This initiates bridging of the plugging material near the producing well. Continued pumping of solids into the injection well then causes the fracture to be "pressure packed" in the producing well vicinity back to the desired distance from the injection well.

The technique just described can be further modified. Immediately after solids from the injection well are recovered in the produced well fluid, the producing well is shut down. Then graded solids are pumped into the producing well similarly as described above for the injection well. This aids in initiating a bridge of the solids near the producing well so that the inter-well fracture can be fully packed by continued pumping of the solids mixture into the injection well. The presence of the coarse material in the fracture adjacent the producing well bore aids in restraining the finely divided solids from subsequently re-entering the producing well when it is returned to production.

The technique just described can be further modified by initially pumping the mixture into the producing well instead of the input well. When the material is recovered at the injection well, selectively larger size nutshells are pumped in until the fracture is bridged at the producing well. When a bridge is formed, the plugging mixture is then injected through the injection well and continued until the desired injection pressure is obtained. The previously placed bridge at the producing well aids in ensuring that the inter-well fracture is progressively sealed and that the final desired injection pressure is attained.

In these modifications just discussed, the finely divided solids and the coarse materials used to plug the fractures are similar to those described above in the main embodiment of the invention.

It is contemplated that in some areas the inter-well fracture volumes are too large to economically warrant plugging completely the inter-well fracture system. One modification of this invention to aid in this solution is to initially pump at a sufficiently high rate to create the necessary fracture clearance which will then accept large size plugging material, e.g., material in the 4 to 20 mesh U.S. Standard Sieve sizes, to the desired distance from the injection well. The pumping rate is then decreased, e.g., to about 20 to 200 b.h.p., so that the fracture clearance will diminish and entrap the larger size solids or material. The finely divided solids containing drilling clay or bentonite, if desired, as taught above, are then injected and will bridge on the previously placed large solids to create a continuous seal back toward the injection well. If particles having densities greater than about 1.5 as described above are used, some additive such as drilling clay should be added to the carrier water to aid in maintaining the particles in suspension. A greater density solid, for example, is a fine, naturally occurring sand referred to as "blow sand," which has a grain density of about 2.6 to 2.7. When such material is used, it should have a particle size of 100% passing through 60 mesh.

While the above invention has been described with a large degree of detail and description of various embodiments, other modifications thereof can be made without departure from the spirit or scope of the invention.

We claim:

1. A method of selectively plugging an inter-well area of an underground formation having existing fractures and penetrated by a well bore which comprises the step of injecting a liquid slug containing finely-divided, low-density, non-settling solids into said formation through said well at a pressure in the range from the fracture opening pressure to below the fracturing pressure required to create a fracture therein, essentially all said solids having a particle size of essentially 100% passing a 60 mesh sieve, U.S. Standard Sieve Series, the filtrate of said liquid and said solids being of a type to readily penetrate the walls of said fracture.

2. A method as defined in claim 1 in which the solids have a density of not over about 1.5 grams per cubic centimeter.

3. A method as defined in claim 1 in which said liquid contains only finely-divided, nonsoluble solids having a grain density of not over about 1.5 grams per cubic centimeter and a particle size of essentially 100% smaller than 60 mesh.

4. A method as defined in claim 1 in which the concentration of the solids in the liquid is varied essentially linearly, with respect to time of the process, from about 0.1 pound of solids per gallon of liquid at the beginning of the process, to about 6.0 pounds per gallon of liquid at the end of said process.

5. A method as defined in claim 4 in which the pressure in the well bore is maintained above the fracture opening pressure throughout the process.

6. A method as defined in claim 1 including the step of simultaneously decreasing the injection rate of the liquid and increasing the solids concentration therein.

7. A method of selectively plugging an inter-well area of an underground formation penetrated by an input well and an output well and having existing fractures in the inter-well area which comprises: injecting a slug of liquid containing finely-divided, low-density, non-settling solids, essentially all said solids having a particle size of essentially 100% being smaller than 60 mesh, U.S. Standard Sieve Series, into said formation through said input well at a pressure above the fracture opening pressure of said formation but below the fracturing pressure thereof, said finely divided solids being sufficiently large to prevent substantial filtration of such finely divided solids through the wall of said fractures into the said formation, the filtrate of the mixture of said liquid and said solids being of a type to readily penetrate the walls of said fracture.

8. A method as defined in claim 7 which prior to injecting said finely divided solids includes the step of injecting a fluid containing a tracer into said input well at a pressure above the fracture opening pressure but below the fracturing pressure, measuring the volume of liquid injected when the tracer appears in the output well to obtain the volume of the fracture system between said wells, the amount of finely-divided, low-density, non-settling solids thereafter injected being in a quantity which is equal to at least ½ the volume of the fracture system, such finely divided solids being further characterized as being nonsettable.

9. A method as defined in claim 7 including the step of thereafter injecting a liquid containing coarse solids at a pressure above the said fracture opening pressure, such material to be sufficiently coarse to cause a screenout in the said fracture system.

10. A method as defined in claim 9 of after the step thereof to thereafter inject a displacing liquid containing essentially no solids so as to displace said coarse solids a considerable distance from the said input well bore, and then thereafter injecting a secondary recovery driving fluid into said formation through said input well.

11. A method as defined in claim 10 in which said displacing liquid contains a material for increasing the viscosity of said displacing liquid, such material including guar gum-water gel having a concentration of about 10 to 60 pounds of guar gum per 1,000 gallons of water and an enzyme to promote hydrolysis of the gel under reservoir conditions.

12. A method as defined in claim 7 in which said finely divided solids are hard plant seed flour having a particle size of 100% −60 mesh.

13. A method as defined in claim 12 including the addition of calcium montmorillonite in a ratio of one part montmorillonite to from ten to twenty parts of hard plant seed flour concentration.

14. A method as defined in claim 12 including the addition of sodium montmorillonite in a ratio of one part sodium montmorillonite to from ten to twenty parts of hard plant seed flour concentration.

15. A method as defined in claim 7 in which said finely divided solids are nutshell flour having a particle size of 100% passing 60 mesh.

16. A method as defined in claim 7 in which said finely divided solid is ground plastic having a particle size of 100% −60 mesh, and the liquid is essentially free of other solids.

17. A method as defined in claim 7 including the step of:
producing fluid from said output well until said finely divided solids are recovered in such produced fluid, stop producing fluid from said output well, and thereafter injecting through said output well a fluid containing finely divided solids.

18. A method as defined in claim 7 in which large plugging solids having particle size of from about 6 to 12 mesh are injected through said input well and displaced a desired distance therefrom prior to the injection of the liquid containing the finely divided solids, said injection of fluid containing the finely divided solids being at a reduced rate causing the fracture clearance to diminish and entrap the large size material so that the subsequently injected finely divided solids will bridge on the previously placed large size solids.

19. A method of selectively plugging an inter-well area of an underground formation penetrated by a first well and a second well and containing existing fissures which comprises: injecting a slug of liquid containing finely-divided, non-settling, non-settable solids, insoluble in the formation fluid, into said formation through said first well at a pressure sufficient to open said fissures, said slug containing only finely divided solids having a particle size of essentially 100% being smaller than 60 mesh, but large enough to prevent substantial filtration of such finely divided solids through the wall of said fissure into the said formation, the filtrate of the mixture of said liquid and said solids being of a type to readily penetrate the walls of said fissures.

20. A method as defined in claim 19 in which said finely divided solids are blow sand, and in which the liquid contains sodium montmorillonite to aid in maintaining the solids in suspension.

21. A method as defined in claim 20 including the step of thereafter injecting a liquid containing coarse solids having a particle size of from about 6 to about 12 mesh U.S. Standard Sieve Series, said coarse solids being injected at a pressure above the said fissure opening presure but below the fracturing pressure.

22. A method as defined in claim 13 including the step of simultaneously linearly decreasing the injection rate of the liquid and linearly increasing the solids concentration therein, said solids being composed of material which has a very low permeability to water so as when packed in said fissure to effectively plug such fissure against the passage of water.

23. A method of treating an underground formation penetrated by an input well and an output well and having a fracture in the inter-well area which comprises:
first plugging the said fracture from said output well by injecting fluid containing finely-divided, low-density, non-settable solids in said output well and progressively increasing the size of such solids until the fracture is bridged at the output well, said injection being at an injection pressure in the range from the fracture opening pressure to below the fracturing pressure required to create a fracture therein; and
thereafter start injecting a fluid containing finely divided solids into said input well at the same range of injection pressure as that for the fluid injected into said output well.

24. A method of selectively plugging fractures in an inter-well area in an underground formation penetrated by a well bore which comprises the steps of injecting a liquid containing finely-divided, low-density, non-settling solids, there being from about 0.1 pound to about 6.0 pounds of solids per gallon of liquid, into said formation through said well at the pressure in the range from the fracture opening pressure to below the fracturing pressure required to create a fracture therein; and thereafter injecting a liquid containing essentially no solids so that solids are displaced away from well bore along the fracture so that the fracture adjacent the well bore remains unplugged.

25. A method of selectively plugging an underground formation having existing fractures and penetrated by a well bore which comprises the step of injecting a liquid containing finely-divided, low-density, non-settling solids into said formation through said well at a pressure in the range from the fracture opening pressure to below the fracturing pressure required to create a fracture therein; thereafter injecting a liquid containing coarse solids at a pressure above said fracture opening pressure and below the fracturing pressure, such coarse solids being sufficiently coarse to cause a screenout in said existing fracture.

26. A method as defined in claim 25 in which the said coarse solids have a particle size of from about 6 to 12 mesh.

27. A method of selectively plugging an underground formation penetrated by an input well and an output well and having existing fractures in the inter-well area which comprises:

injecting a liquid containing finely-divided, low-density, nonsettling solids into said formation through said input well at a pressure above the fracture opening pressure of said formation but well below the fracbeing sufficiently large to prevent substantial filtration of such finely-divided solids through the wall of said fractures into the said formation, simultaneously decreasing the injection rate of the liquid and increasing the solids concentration therein, the concentration of solids being in the range of 0.1 to 6.0 pounds per gallon of liquid.

28. A method of selectively plugging an underground formation penetrated by an input well and an output well and having existing fractures in the inter-well area which comprises:

injecting a liquid containing finely-divided, low-density, non-settling solids into said formation through said input well at a pressure above the fracture opening pressure of said formation but below the fracturing pressure thereof, said finely-divided solids being sufficiently large to prevent substantial filtration of such finely-divided solids through the wall of said output well until said finely divided solids appear in the produced fluid, then stop producing from said output well and then injecting water into said output well at a pressure such that the pressure gradient in the fracture system will be reversed so that the pressure in the well bore is greater than that in the fracture immediately adjacent the well bore of said output well, to thereby initiate bridging of the solids near the output well and continuing injection of said finely divided solids through said input well.

References Cited

UNITED STATES PATENTS

| | | | |
|---|---|---|---|
| 2,283,645 | 5/1942 | Means | 252—8.5 |
| 2,546,252 | 3/1951 | Bankson | 166—10X |
| 2,626,779 | 1/1953 | Armentrout | 175—72X |
| 2,943,680 | 7/1960 | Scott et al. | 252—8.5 |
| 3,075,581 | 1/1963 | Kern | 166—42 |
| 3,153,450 | 10/1964 | Foster et al. | 166—42 |
| 3,193,011 | 7/1965 | Rickard | 166—33 |
| 3,280,912 | 10/1966 | Sheffield | 166—29 |
| 3,323,594 | 6/1967 | Huitt et al. | 166 42 |
| 3,331,438 | 7/1967 | Slusser | 166—29 |
| 3,349,844 | 10/1967 | Rhea et al. | 166—4 |

CHARLES E. O'CONNELL, Primary Examiner

I. A. CALVERT, Assistant Examiner

U.S. Cl. X.R.

166—275, 292

PO-1050
(5/69)

UNITED STATES PATENT OFFICE
CERTIFICATE OF CORRECTION

Patent No. 3,486,559            Dated December 30, 1969

Inventor(s) Don H. Flickinger and Clarence R. Fast

It is certified that error appears in the above-identified patent and that said Letters Patent are hereby corrected as shown below:

Column 1, line 14, "liquir" should read -- liquid --; line 26, "formation" should read -- formations --.

Column 2, line 8, "gis-" should read -- fis- --; line 36 "taine" should read -- tained --.

Column 5, line 66, "frocture" should read -- fracture --.

Claim 22, line 1 "claim 13" should be -- claim 19 --.

Claim 27, column 9, between lines 10 and 11, insert -- turing pressure therec , said finely divided solids --.

Claim 28, column 9, between lines 28 and 29, insert -- fractures into the sai formation, producing the --.

SIGNED AND
SEALED
JUN 16 1970

(SEAL)
Attest:

Edward M. Fletcher, Jr.
Attesting Officer

WILLIAM E. SCHUYLER, J
Commissioner of Patent